United States Patent [19]
Holleman

[11] 3,782,210
[45] Jan. 1, 1974

[54] CHANGEABLE SPEED GEAR ATTACHMENT FOR BICYCLES

[76] Inventor: Quanah P. Holleman, 146 E. Bayview Blvd., Norfolk, Va. 23503

[22] Filed: Oct. 4, 1972

[21] Appl. No.: 294,878

[52] U.S. Cl. ................. 74/217 B, 74/415, 280/236
[51] Int. Cl. ............................................. F16h 9/00
[58] Field of Search ...................... 74/217 R, 217 B, 74/415; 280/236

[56] References Cited
UNITED STATES PATENTS
616,381   12/1898   White ................................. 74/415

Primary Examiner—Charles J. Myhre
Assistant Examiner—Frank H. McKenzie, Jr.
Attorney—Herbert I. Cantor et al.

[57] ABSTRACT

A changeable speed gear attachment for mounting on a standard bicycle without the need for modification of the bicycle is disclosed. The attachment includes a housing which mounts on the frame of the bicycle and includes a driving pinwheel gear having several adjacent concentric rows of teeth, a driven pinwheel gear having at least one row of teeth, a driving pinion gear operating off the driving pinwheel gear and slidably mounted so as to selectively engage one of the several rows of teeth, and a driven pinion gear which is driven by the driving pinion gear and which, in turn, drives the driven pinwheel gear. The pinwheel gears are each connected to a sprocket externally of the housing and the sprockets are connected to the sprockets of the bicycle by means of conventional bicycle chains.

16 Claims, 7 Drawing Figures

3,782,210

CHANGEABLE SPEED GEAR ATTACHMENT FOR BICYCLES

BACKGROUND OF THE INVENTION

The present invention relates to bicycles, and more particularly, the present invention relates to changeable speed bicycle gears, and specifically to a changeable speed gear attachment.

There has been very little change in basic bicycle design over the years, the product being sold today being essentially the same as that sold almost one hundred years ago. Except for improvements in materials and in the introduction of new types of bearings or the like, most of the improvements over the years have been directed to what might be called "accessories." For example, the first bicycles made had no braking system but were slowed or stopped by the rider dragging his feet on the ground. Gradually various types of braking systems were devised culminating in the two basic types of bicycle brakes used on modern bicycles, the first being of an external type which exerts a rubbing or braking action on the wheels, and the second being of an internal type generally known as a "coaster" brake.

Other important developments in bicycle accessories were made in the field of speed changing mechanisms. Again, speed changing mechanisms for bicycles have fallen into two basic categories, namely, internal mechanisms and external mechanisms. In the internal speed changing mechanisms, a complex gear arrangement is provided within a hollow rear wheel hub and usually consists of three speeds. This type of arrangement has proven satisfactory for general recreational use and attained much popularity under the general description of "English racer."

In the area of external speed changing mechanisms, there have been innumerable designs for a variety of gear mechanisms incorporated in the manufacture of the bicycle. For example, in U.S. Pat. No. 580,366, granted to J. W. Brasfield et al. on Apr. 13, 1897, an arrangement is disclosed wherein a transmission gear box replaces the main driving sprocket of the bicycle and has a driving gear activated directly by the pedal cranks. Power is transmitted through a series of cog wheels and then through a chain to the rear wheel. Gear ratios are shifted by slidably shifting various gears upon their shafts. Other designs, such as those disclosed by T. B. Snyder in U.S. Pat. No. 536,550, and A. Weaver in U.S. Pat. No. 2,561,960, use a slotted disc as a gear which meshes with a pinion gear of one type or another. This gearing arrangement can either be used as the driving gear, connected directly to the pedal cranks, or the driven gear, mounted at the rear wheel. A bevel gear arrangement at the end of a drive shaft connected to the pinion completes the assembly. Still another arrangement, among the many prior art speed shifting mechanisms, is disclosed in U.S. Pat. No. 715,404, granted to F. Markgraf on Dec. 9, 1902. In this arrangement, a housing integral with the bicycle frame is provided with the pedal cranks journalled into the same. The pedal cranks are connected to a bevel driving gear and pinion which, in turn, is connected through a drive shaft pinion mounted with a ratchet arrangement and driving a pinwheel gear which is mounted on the rear wheel. This arrangement was extremely cumbersome and suffered from the same basic disadvantage of the other prior art, that is, the necessity for being manufactured integrally with the bicycle frame and being driven directly through a drive shaft. An attempt was made to solve certain problems by providing a transmission gear attachment for bicycles, this attachment being the subject matter of U.S. Pat. No. 1,736,680, granted on Nov. 19, 1929 to W. A. Toliver. This attachment mounted on the lower portion of the central framing of the bicycle, generally being located where the main drive sprocket would ordinarily be. The main drive sprocket is removed from the bicycle and the attachment mounted in its place. The attachment included a plurality of gears of different sizes slidably mounted on shafts for shifting. The pedal cranks were directly attached to a driving gear and a sprocket wheel is provided for the power take off, through a chain, to the rear wheel. It is clear that this attachment, while eliminating the necessity for a transmission which is integral with the bicycle frame, required modification of the bicycle in order to make it fit. This device, like the other prior art devices, was also inefficient.

The in-hub and chain-shift types of gearing in wide use today require that the rider apply brakes to the rims of the front and rear wheel by means of hand operated levers, one for each wheel. Frequently, riders are thrown, and occasionally injured, when they inadvertently apply brakes to the front wheel first. With the installation of the attachment of the present invention, this hazardous condition is eliminated. Brakes are applied by the conventional method of reversing the pedals, providing power through the gears, to the rear sprocket of the bicycle which activates the coaster brake.

SUMMARY OF THE INVENTION

It is, therefore, an object of the present invention to provide a changeable speed gear attachment for bicycles which is free of the aforementioned and other such disadvantages.

It is a primary object of the present invention to provide a changeable speed gear attachment for bicycles which can be inexpensively manufactured and easily mounted on a standard bicycle without the need for modification to the bicycle.

It is another object of the present invention to provide a changeable speed gear attachment for bicycles which is easy and efficient to use.

It is still another object of the present invention, consistent with the foregoing objects, to provide, in combination, a bicycle with a changeable speed gear attachment.

Accordingly, in order to implement these and still further objects of the present invention, which will become more readily apparent as the description thereof proceeds, it should be noted that the changeable speed gear attachment of the present invention comprises a housing having mounting means thereon for mounting the housing on the frame of the bicycle, such that the attachment will be operationally between the main drive sprocket and the rear wheel sprocket of the bicycle. Within the housing are a driving pinwheel gear having a plurality of adjacent concentric rows of teeth, a driven pinwheel gear having at least one row of teeth, first pinion gear means adapted to selectively engage each of the rows of teeth on the driving pinwheel gear, and second pinion gear means driven by the first pinion gear means and adapted to engage the row of teeth on the driven pinwheel gear. The pinwheel gears are journalled within the housing and a first sprocket, externally of the housing, is operatively connected to the driving pinwheel gear and adapted to be operatively connected to the main drive sprocket of the bicycle by means of a chain. A second sprocket, externally of the housing, is operatively connected to the driven pinwheel gear and adapted to be operatively connected to the rear wheel sprocket of the bicycle by means of a chain. Additionally, means for shifting the first pinion gear means to selectively engage each of the rows of teeth of the driving pinwheel gear is provided. The housing is preferably a closed housing and, in a preferred embodiment, is adapted to be mounted on the rear fork of the bicycle. In the preferred embodiment, the driving pinwheel gear has at least three adjacent concentric rows of teeth, thereby providing at least three speeds for the bicycle. In another embodiment, the driven pinwheel gear can have at least two adjacent concentric rows of teeth, thereby providing a "dual range" transmission. In this embodiment, the second pinion gear means is adapted to selectively engage each of the rows of teeth on the driven pinwheel gear and means for shifting the second pinion gear means is also provided.

It is important to the instant invention that the teeth of the pinwheel gears, which will be described more fully hereinbelow, be either circular or diamond-shaped in cross-section. The linear distance between adjacent teeth in each of the adjacent rows on any one of the pinwheel gears is equal. Additionally, it is preferable that the first sprocket have a pitch diameter no greater than the diameter of the innermost row of teeth on the driving pinwheel gear. Also, a feature of the instant invention which is extremely important, is the fact that when the changeable speed gear attachment is mounted on the bicycle, the main drive sprocket of the bicycle, the rear wheel sprocket of the bicycle, and the first and second sprockets of the attachment are all coplanar.

BRIEF DESCRIPTION OF THE DRAWINGS

This invention will be better understood, and objects other than those set forth above will become apparent when consideration is given to the following detailed description thereof. Such description makes reference to the annexed drawings wherein.

DESCRIPTION OF THE PREFERRED EMBODIMENTS

Figure 1:
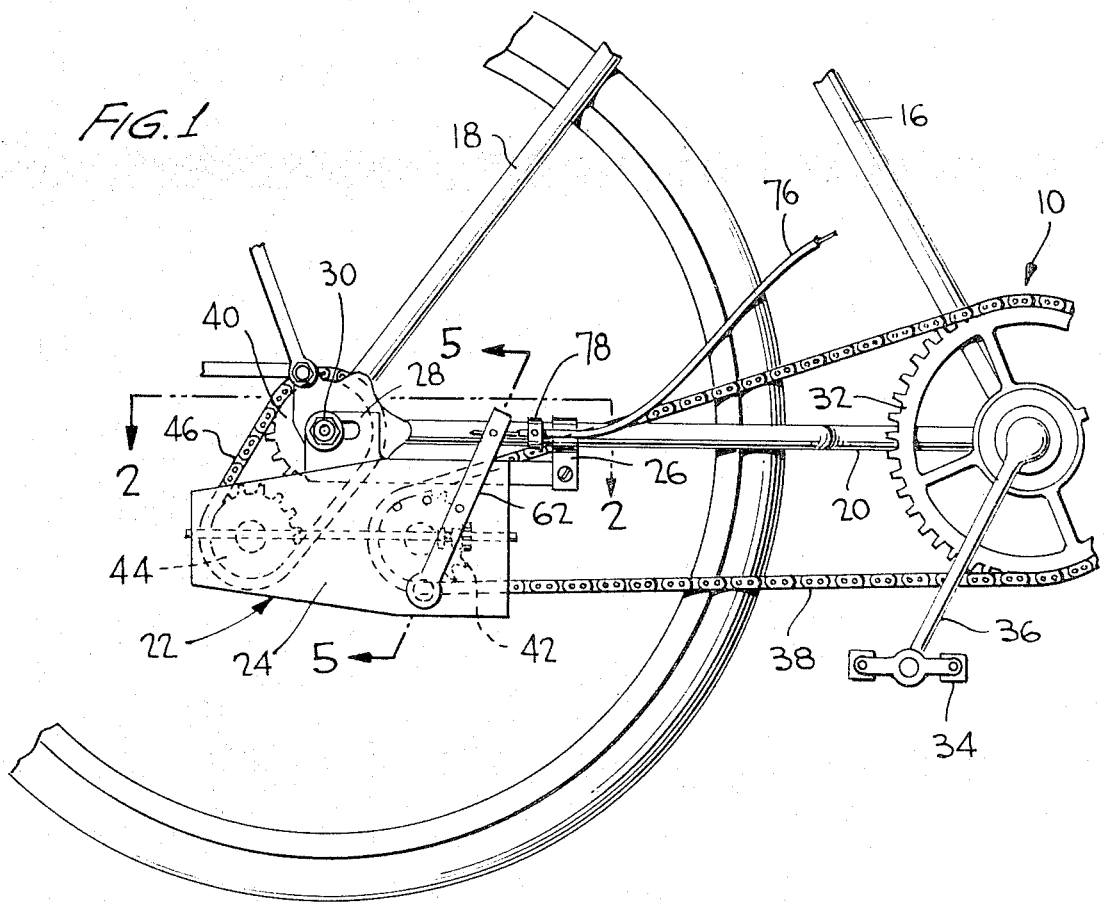
FIG. 1 is a partially fragmentary side elevational view of a standard bicycle with the attachment of the instant invention mounted thereon according to a preferred embodiment.

Turning first to FIG. 1, there will be seen a fragmentary portion of a standard bicycle generally designated by the numeral 10. The attachment of the instant invention is mounted on the frame of the bicycle, the frame 16 generally including a rear fork 18 having a generally horizontal leg 20. The changeable speed gear attachment of the instant invention is generally designated by the numeral 22 and includes a housing 24 which is preferably closed to keep out dirt, water, and the like. The housing 24 is mounted on the rear fork 18, 20, by means of a forward bracket 26 and a rearward bracket 28 which mounts on the standard axle bolt of the rear wheel and held in place by the standard nut 30.

Figure 2:
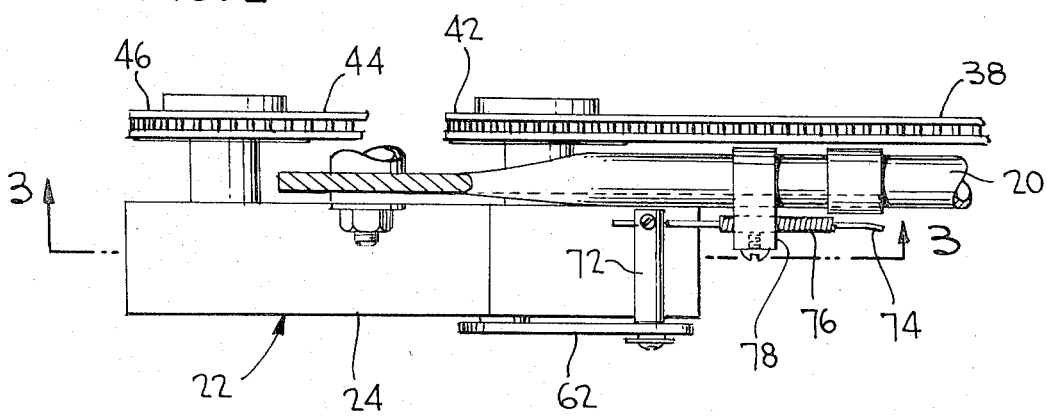
FIG. 2 is a horizontal cross-sectional view taken on the line 2—2 of FIG. 1.

The standard bicycle 10 also includes main drive sprocket 32 which is driven by pedals 34 and pedal cranks 36. The standard bicycle chain 38 which ordinarily would be connected to rear wheel sprocket 40 is instead connected to a first sprocket 42, which is shown in phantom in FIG. 1 of attachment of 22. A second sprocket 44, also shown in phantom in FIG. 1, is then connected to rear wheel sprocket 40 by means of a short length of standard bicycle chain 46. Sprockets 42 and 44 can be seen more clearly in FIG. 2.

Figure 3:
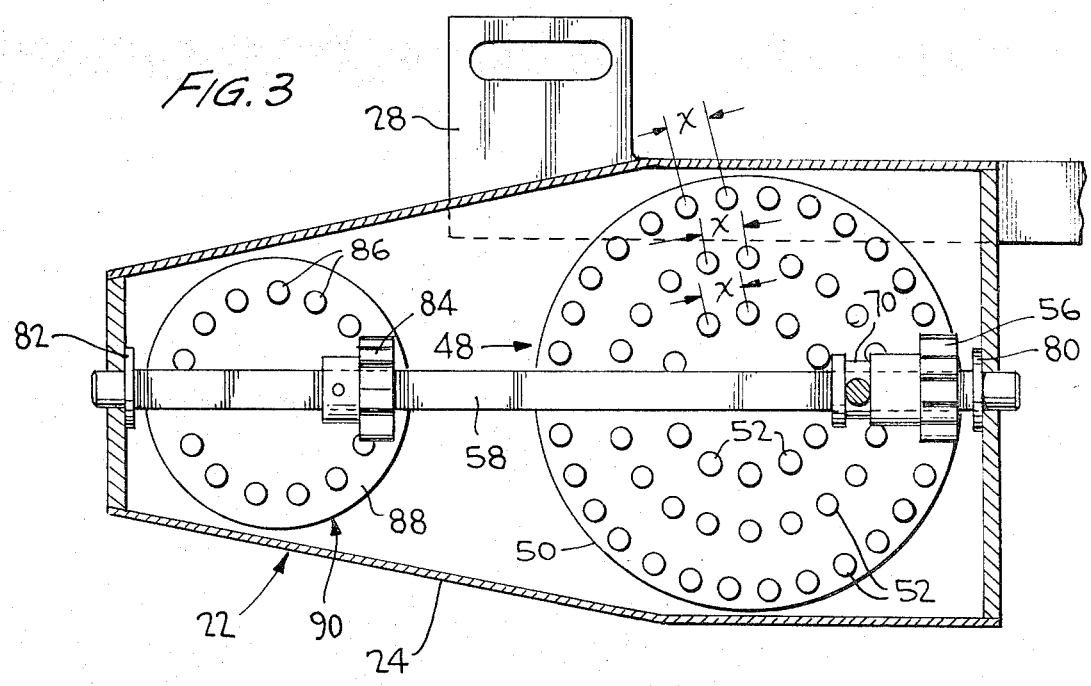
FIG. 3 is a vertical cross-sectional view of the attachment of the instant invention taken on the line 3—3 of FIG. 2.
Figure 4:
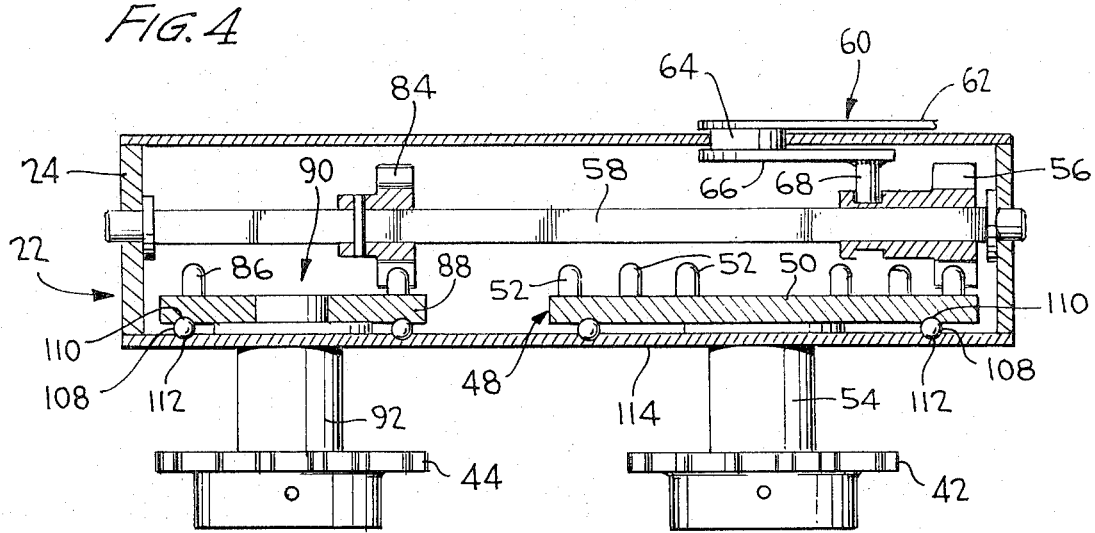
FIG. 4 is a horizontal cross-sectional view of the attachment of FIG. 3.

Attention is now directed to FIG. 3 wherein the internal mechanism of the changeable speed gear attachment 22 is shown. A driving pinwheel gear generally designated by the numeral 48 comprises a flat circular disc 50 having a plurality of adjacent concentric rows of teeth 52. Driving pinwheel gear 48 is mounted on a shaft 54 which is journalled in housing 24 and attached to first sprocket 42, as can be better seen in FIG. 4.

A first pinion gear 56 is provided, mounted on shaft 58. Pinion gear 56 is adapted to move longitudinally to selectively engage one of the adjacent concentric rows of teeth 52, thereby changing the gear ratio and the speed. This can be done in one of several conventional ways. In the embodiment shown in FIGS. 3 and 4, pinion gear 56 is slidable longitudinally on shaft 58 and is shifted by means of the shifting mechanism generally designated 60 which includes a lever 62 which, through pivot 64, moves lever 66 having at one end thereof a pin 68 which engages notch 70 of the pinion gear 56. Turning back momentarily to FIGS. 1 and 2, lever 62 is connected through arm 72 to a conventional means such as a cable or wire 74 sliding within a tubular cable housing member 76 which is affixed to rear fork 20 by means of a clamp 78.

Returning to FIGS. 3 and 4, it can be seen that while pinion gear 56 is adapted to slide longitudinally on shaft 58, pinion gear 56 is fixed to shaft 58 for rotational movement. Shaft 58 is journalled in the housing 24 at 80 and 82. At the rearward end portion of shaft 58 is fixed a second pinion gear 84 which engages a row of teeth 86 in circular disc 88 which thereby makes up driven pinwheel gear 90. Driven pinwheel gear 90 is mounted on a shaft 92 journalled through housing 24 and fixed to second sprocket 44.

Figure 5:
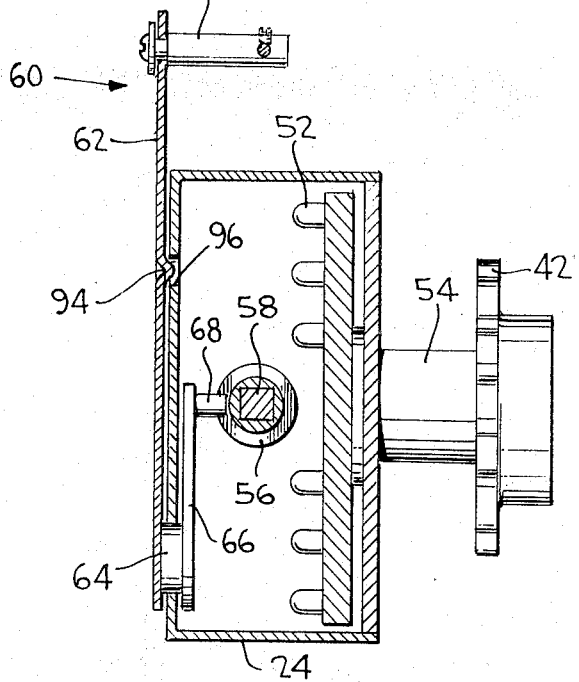
FIG. 5 is a vertical cross-sectional view of the attachment of the instant invention taken on the line 5—5 of FIG. 1.

Thus, it will be seen that in operation, when force is applied to pedals 34 and, thereby, to pedal cranks 36, main sprocket 32 turns thereby turning chain 38 which, in turn, turns sprocket 42. When sprocket 42 is turned, driving pinwheel gear 48 is turned, thereby transmitting the motion to first pinion gear 56. The speed of revolution of pinion gear 56 is de-pendent on which of the adjacent concentric rows of teeth 52 it is engaging. Pinion gear 56 transmits the motion through shaft 58 to pinion gear 84 which, in turn, turns driven pinwheel gear 88, thereby turning second sprocket 44. Second sprocket 44 drives the rear wheel sprocket 40 of the bicycle by means of chain 46. The speed of the bicycle is changed by shifting pinion 56 by the shifting means 60, which can be better visualized by referring to FIG. 5. It will be seen in FIG. 5 that lever 62 is indented at 94, this indentation contacting one of a plurality of detents 96 provided in housing 24 to indicate to the rider of the bicycle when the shifting action is completed for any particular gear he desires to shift into.

Figure 6:
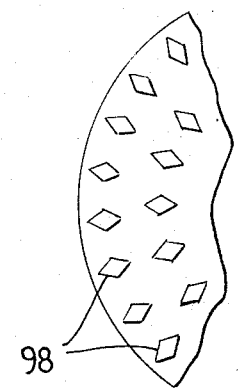
FIG. 6 is a partially fragmentary side elevational view of a second embodiment of the pinwheel gear used in the attachment of the instant invention.

Returning momentarily to FIG. 3, it will be seen that the teeth 52 in pinwheel gear 48 and teeth 86 in pinwheel gear 90 are circular in cross-section in the preferred embodiment. In another embodiment shown in FIG. 6, diamond-shaped, or rhombic, teeth 98 are shown. It is important to the present invention that the teeth be either circular or rhombic in cross-section in order to provide the proper sliding motion between the teeth 52, for example, and pinion 56, which accompanies the rotational motion. This construction assures a fairly loose fit and takes up any backlash or play between the pinion and the pinwheel gear. This could not be accomplished with teeth which are hexagonal, square, or the like, in cross-section.

Figure 7:
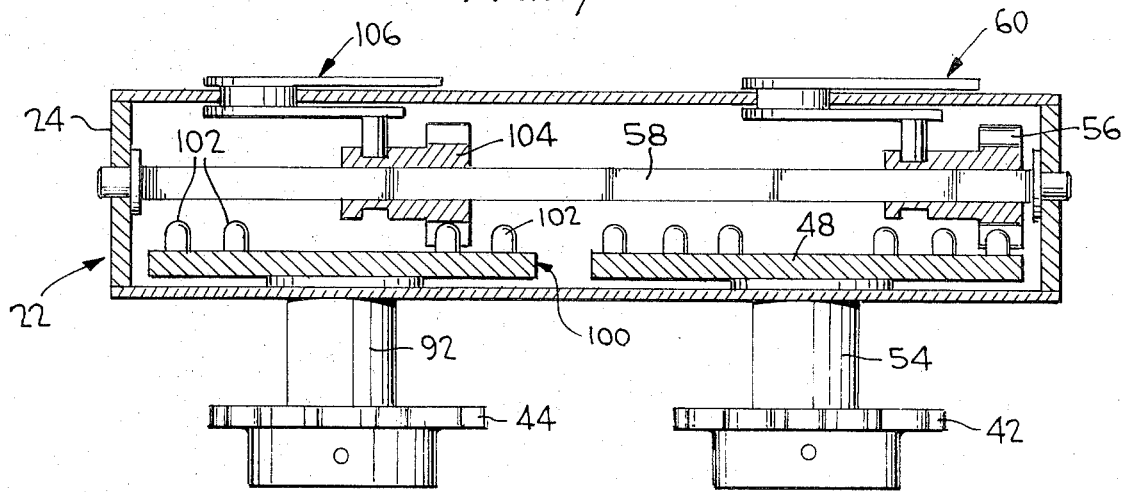
FIG. 7 is a horizontal cross-sectional view of the attachment of the instant invention according to another embodiment.

Still another embodiment of the instant invention is shown in FIG. 7 wherein housing 24, pinwheel gear 48, pinion 56, shifting mechanism 60, shaft 58, and sprockets 42 and 44 are the same as in the preceding embodiments. In this embodiment, the driven pinwheel gear, generally designated by the numeral 100 has at least one adjacent concentric rows of teeth 102. The second pinion gear 104 is movable so as to selectively engage one of the rows of teeth 102. The pinion 104 is shifted by shifting means 106 which is generally constructed the same as shifting means 60. An advantage to be gained by using the construction of this latter embodiment, is that a "dual range" mechanism is obtained. In essence, six speeds are available by using this embodiment since pinion 56 can engage one of three rows of teeth to achieve three different speeds and pinion 104 can be moved to engage one of two rows of teeth thereby obtaining two ranges. If a third row of teeth is included in pinwheel gear 100, then there would essentially be nine speeds obtainable by this attachment.

It should be noted that the linear distance "x" between adjacent teeth in any of the rows of teeth is always the same. Also, it is preferable that the sprocket 42 has no greater pitch diameter than that of the smallest driving gear, which corresponds to the innermost row of teeth 52 on the driving pinwheel 48.

In order to reduce strain on the outer portion of pinwheel gears 48 and 90 and on shafts 54 and 92 with their corresponding bearings, it is preferred to include a bearing surface such as ball bearings 108 riding in grooves 110 and 112 in plates 50 and 88, and the inner surface of back wall 114 of housing 24, respectively. Spacing between ball bearings 108 is maintained by a circular retaining ring (not shown).

While the present invention has been described by reference to a preferred embodiment wherein driving pinwheel gear 48 is provided with a plurality of adjacent concentric rows of teeth, driven pinwheel gear 90 is provided with at least one row of teeth, and speeds are changed by shifting pinion 56 to engage different rows of teeth on driving pinwheel gear 48, it should be clearly understood that these functions could be reversed. More specifically, the driven pinwheel gear could have a plurality of adjacent concentric rows of teeth and pinion gear 84 could be arranged to shift between these rows of teeth. Driving pinwheel gear 48 would then have at least one row of teeth.

It should be apparent from the foregoing detailed description that the objects set forth hereinabove have been successfully achieved. Moreover, while there is shown and described a present preferred embodiment of the instant invention, it is to be distinctly understood that the invention is not limited thereto but may be otherwise variously embodied and practiced within the scope of the following claims.

What is claimed is:

1. A changeable speed gear attachment, for mounting on a standard bicycle without the need for modification of said bicycle, comprising a housing having mounting means thereon for mounting said housing on the frame of said bicycle operatively between the main drive sprocket and the rear wheel sprocket of said bicycle; a driving pinwheel gear; a first sprocket operatively connected to said driving pinwheel gear and adapted to be operatively connected to said main drive sprocket by means of a chain; a driven pinwheel gear; a second sprocket operatively connected to said driven pinwheel gear and adapted to be operatively connected to said rear wheel sprocket by means of a chain; first pinion gear means adapted to engage said teeth on said driving pinwheel gear; second pinion gear means driven by said first pinion gear means and adapted to engage said teeth on said driven pinwheel gear; one of said pinwheel gears having a plurality of adjacent rows of teeth, the other of said pinwheel gears having at least one row of teeth; the pinion gear means which engages the teeth of said pinwheel gear having a plurality of rows of teeth being adapted to selectively engage each of said rows of teeth; and means for shifting said pinion gear means which selectively engages said rows of teeth to selectively engage each of said rows of teeth, whereby different gear ratios may be selected.

2. A changeable speed gear attachment as defined in claim 1, wherein said housing is closed.

3. A changeable speed gear attachment as defined in claim 1, wherein said housing is adapted to be mounted on the rear fork of said bicycle.

4. A changeable speed gear attachment as defined in claim 1, wherein said driving pinwheel gear has at least three adjacent concentric rows of teeth.

5. A changeable speed gear attachment as defined in claim 1, wherein said driven pinwheel gear has at least two adjacent concentric rows of teeth and said second pinion gear means is adapted to selectively engage each of said at least two rows of teeth, said attachment further comprising means for shifting said second pinion gear means to selectively engage each of said at least two rows of teeth, whereby a plurality of ranges of gear ratios may be obtained.

6. A changeable speed gear attachment as defined in claim 5, wherein the linear distance between adjacent teeth in each of said adjacent rows of one of said pinwheel gears is equal.

7. A changeable speed gear attachment as defined in claim 1, wherein said teeth of said pinwheel gears are circular in cross-section.

8. A changeable speed gear attachment as defined in claim 1, wherein said teeth of said pinwheel gears are rhombic in cross-section.

9. A changeable speed gear attachment as defined in claim 1, wherein said first sprocket has a pitch diameter no greater than the diameter of the innermost row of teeth on said driving pinwheel gear.

10. A changeable speed gear as defined in claim 1, in combination with a bicycle.

11. A combination as defined in claim 10, wherein said first sprocket is operatively connected to said main drive sprocket by means of a standard bicycle chain.

12. A combination as defined in claim 10, wherein said bicycle includes a coaster brake.

13. A combination as defined in claim 10, wherein said main drive sprocket, first sprocket, second sprocket, and rear wheel sprocket are coplanar.

14. A changeable speed gear attachment as defined in claim 1, further comprising strain-reducing bearing means between said pinwheel gears and said housing.

15. A changeable speed gear attachment as defined in claim 1, wherein said driving pinwheel gear has said plurality of rows of teeth and said first pinion gear means is adapted to selectively engage each of said rows of teeth.

16. A changeable speed gear attachment as defined in claim 1, wherein said driven pinwheel gear has said plurality of rows of teeth and said second pinion gear means is adapted to selectively engage each of said rows of teeth.

* * * * *